(12) United States Patent
Zhang

(10) Patent No.: US 12,565,868 B2
(45) Date of Patent: Mar. 3, 2026

(54) CARBON CANISTER ASSEMBLY AND AN ENGINE

(71) Applicants:MAHLE Automotive Technologies (China) Co., Ltd., Shanghai (CN); MAHLE International GmbH, Stuttgart (DE)

(72) Inventor: Hui Zhang, Shanghai (CN)

(73) Assignees: MAHLE AUTOMOTIVE TECHNOLOGIES (CHINA) CO., LTD. (CN); MAHLE International GmbH (DE)

( * ) Notice: Subject to any disclaimer, the term of this patent is extended or adjusted under 35 U.S.C. 154(b) by 246 days.

(21) Appl. No.: 18/090,097

(22) Filed: Dec. 28, 2022

(65) Prior Publication Data

US 2023/0250780 A1      Aug. 10, 2023

(51) Int. Cl.
B60K 15/035 (2006.01)
F02M 25/08 (2006.01)

(52) U.S. Cl.
CPC ... F02M 25/0854 (2013.01); B60K 15/03504 (2013.01); F02M 25/08 (2013.01); B60K 2015/03514 (2013.01)

(58) Field of Classification Search
CPC .............. F02M 25/08; F02M 25/0854; B60K 15/03504; B60K 2015/03514
USPC .................... 96/121, 122, 133, 136; 123/519
See application file for complete search history.

(56) References Cited

U.S. PATENT DOCUMENTS

| | | | | |
|---|---|---|---|---|
| 4,149,504 A | * | 4/1979 | Walters | F02M 25/0854 137/907 |
| 5,098,054 A | * | 3/1992 | Dyer | F16B 2/08 248/230.8 |
| 5,645,036 A | * | 7/1997 | Matsumoto | F02M 25/0854 123/519 |
| 6,503,301 B2 | * | 1/2003 | Uchino | B01D 53/0415 96/135 |
| 7,922,797 B2 | * | 4/2011 | Kosugi | B01D 53/0415 96/147 |
| 8,992,673 B2 | * | 3/2015 | Mani | B01D 53/04 96/132 |
| 8,997,719 B2 | * | 4/2015 | Kosugi | B60K 15/03504 123/519 |
| 10,508,620 B2 | * | 12/2019 | Kuboyama | F02M 25/0836 |
| 11,326,561 B2 | * | 5/2022 | Akiyama | B01D 53/0446 |
| 2005/0022672 A1 | * | 2/2005 | Loevenbruck | F02M 25/0854 96/144 |
| 2005/0240336 A1 | * | 10/2005 | Reddy | F02D 41/0045 123/520 |
| 2006/0065247 A1 | * | 3/2006 | Leymarie | F02M 37/106 123/519 |

(Continued)

*Primary Examiner* — Erick R Solis
(74) *Attorney, Agent, or Firm* — Fishman Stewart PLLC

(57) ABSTRACT

A carbon canister assembly may include a main carbon canister and an auxiliary carbon canister. The main carbon canister may include a first cavity. The first cavity may be cylindrical. The first cavity may be filled with an adsorption material for adsorbing evaporated fuel vapor. The auxiliary carbon canister may include a second cavity in communication with the first cavity. The second cavity may have a round table shape. A diameter of a cross section of the second cavity may gradually decreases from a bottom of the second cavity to a top of the second cavity.

19 Claims, 1 Drawing Sheet

(56)         References Cited

U.S. PATENT DOCUMENTS

| | | | |
|---|---|---|---|
| 2007/0144496 A1* | 6/2007 | Bellmore ........... | F02M 25/0836 |
| | | | 123/519 |
| 2007/0272080 A1* | 11/2007 | Allen ................. | F02M 25/0854 |
| | | | 96/134 |
| 2008/0184973 A1* | 8/2008 | Yamazaki .......... | F02M 25/0854 |
| | | | 123/519 |
| 2009/0013973 A1* | 1/2009 | Yamasaki .......... | F02M 25/0854 |
| | | | 123/519 |
| 2009/0320806 A1* | 12/2009 | Lang .................... | H04L 27/361 |
| | | | 123/549 |
| 2011/0315126 A1* | 12/2011 | Yoshida ............. | F02M 25/0854 |
| | | | 123/519 |
| 2012/0234301 A1* | 9/2012 | Takamatsu ......... | F02M 25/0854 |
| | | | 123/519 |
| 2012/0304865 A1* | 12/2012 | Sugiura ............. | F02M 25/0854 |
| | | | 96/131 |
| 2015/0107561 A1* | 4/2015 | Makino ............. | F02M 25/0854 |
| | | | 123/519 |
| 2015/0114348 A1* | 4/2015 | Pursifull ......... | F02M 35/10229 |
| | | | 417/151 |
| 2016/0186700 A1* | 6/2016 | Nishiura ........... | F02M 25/0854 |
| | | | 123/519 |
| 2017/0066907 A1* | 3/2017 | Choi ......................... | C08J 5/04 |
| 2020/0198193 A1* | 6/2020 | Suzuki ............... | B29C 45/0025 |
| 2022/0065202 A1* | 3/2022 | Iwamoto ........... | F02M 25/0854 |

* cited by examiner

CARBON CANISTER ASSEMBLY AND AN ENGINE

CROSS-REFERENCE TO RELATED APPLICATION

This application claims priority to Chinese Application No. CN 202123383813.8 filed on Dec. 29, 2021, the contents of which is hereby incorporated by reference in its entirety.

TECHNICAL FIELD

The application belongs to the technical field of auto parts, in particular to a carbon canister assembly and an engine.

BACKGROUND

In recent years, in the face of the environmental pollution caused by motor vehicle gasoline vapor, the national emission requirements are becoming increasingly stringent, especially in the field of household passenger vehicles. Therefore, gasoline engine models need to be equipped with carbon canister devices with oil vapor absorption and desorption performance to meet higher emission requirements. Therefore, installing a more efficient carbon canister in a limited layout space will be a major challenge for vehicle enterprises.

At present, the cross section of the end carbon bed at the atmospheric port of some carbon canister auxiliary cavities has a dead angle. For example, the pyramid structure is adopted, which makes it difficult for the oil and gas molecules in the carbon powder in the dead angle section area to be swept away by the clean air at the atmospheric inlet in the desorption process.

SUMMARY

In the embodiment of the application, the carbon canister assembly provided can effectively avoid the formation of dead corners in the first cavity by setting the first cavity of the main carbon canister into a cylindrical shape; By setting the auxiliary carbon canister in a circular platform shape and gradually reducing the diameter of the cross section of the circular platform shaped second cavity from bottom to top, the formation of dead corners in the second cavity can be effectively avoided and the length of fuel vapor flow can be extended. Based on this, the carbon canister assembly in the embodiment of the application has no dead corner, so that the adsorption materials such as carbon powder are evenly arranged in the first cavity and the second cavity, so that the fuel vapor molecules adsorbed by carbon powder are easily swept away by air in the desorption process, so as to ensure the recycling of the carbon canister assembly and the adsorption effect.

Description of Symbols

100—main carbon canister; 110 first cavity; 120—adsorption port; 130 desorption port; 200 auxiliary carbon canister; 210 second cavity; 211—small end; 212—big end; 220—air port; 300—buffer area; 400 toner.

DETAILED DESCRIPTION

Figure 1:
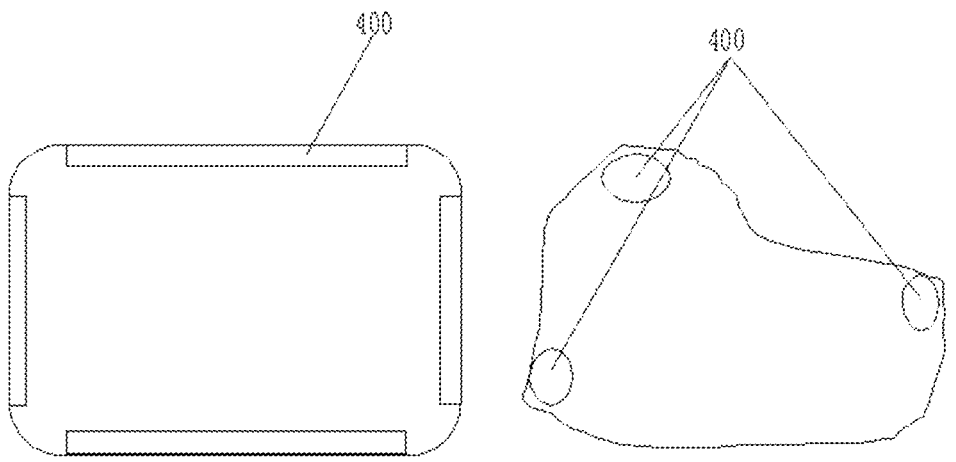
FIG. 1 is a schematic structural diagram of a carbon canister assembly in the prior art.

FIG. 1 shows a partial cross-sectional diagram of an existing carbon canister assembly, which is the cross-sectional arrangement structure of the end carbon bed at the atmospheric port of the auxiliary carbon canister in the carbon canister assembly.

As shown in FIG. 1, the disadvantage of the existing carbon canister assembly is that, in the process of desorption, the oil and gas molecules in the carbon powder 400 in the long straight edge, dead corner or corner section area are difficult to be swept away by the clean air entering through the atmospheric port. At the same time, a right angle will be formed between this edge and the upper edge of the vent, resulting in the side effect of excessive airflow resistance. Further, in the adsorption process, due to the excessive air flow resistance in this area, oil and gas molecules will not escape to the toner 400 here in most cases, resulting in the reduction of the utilization efficiency of toner.

Therefore, it is necessary to improve the structure of carbon canister assembly in order to improve the utilization efficiency of carbon powder. The specific technical scheme is described below.

Figure 2:
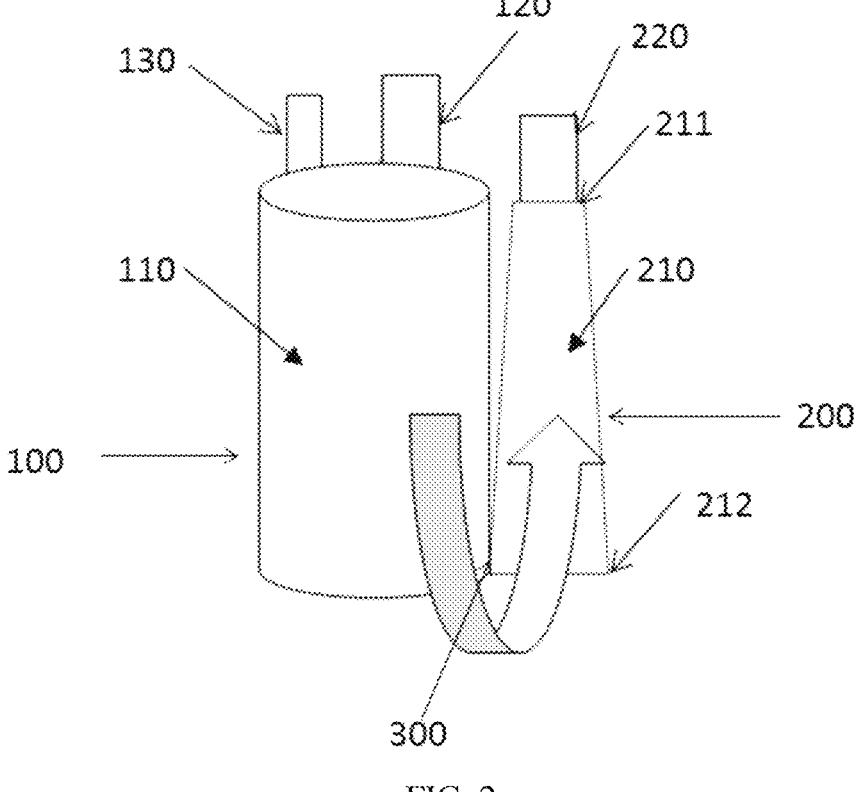
FIG. 2 is a structural diagram of a carbon canister assembly provided in some embodiments of the present application.

Referring to FIG. 2, in some embodiments of the present application, a carbon canister assembly is provided, including a main carbon canister 100 and an auxiliary carbon canister 200.

The main carbon canister 100 has a first cavity 110, which is cylindrical, and the first cavity 110 is filled with an adsorption material such as carbon powder for adsorbing evaporated fuel vapor.

Based on this, during the adsorption process, the fuel vapor entering the first chamber 110 can be adsorbed by carbon powder to prevent air pollution caused by direct discharge of fuel vapor into the external air; In the desorption process, because the inner wall of the first cavity 110 is a smooth structure and there is no dead corner, the possibility of carbon powder accumulation at the dead corner is minimized, so that all carbon powder can adsorb fuel vapor and improve the adsorption effect. Thus, when the atmosphere enters the first chamber 110, it is conducive to make the fuel vapor adsorbed by the carbon powder separate from the carbon powder and enter the engine intake system, so as to realize the full combustion utilization of the fuel vapor and avoid the increase of engine fuel consumption caused by the direct discharge of fuel vapor.

The auxiliary carbon canister 200 has a second cavity 210, the second cavity 210 is in a round table shape, and the second cavity 210 is filled with adsorption materials such as carbon powder for adsorbing evaporated fuel vapor, and the diameter of the cross section of the round table shaped second cavity 210 gradually decreases from bottom to top. Based on this, during the adsorption process, the fuel vapor entering the second chamber 210 can be adsorbed by carbon powder to prevent air pollution caused by direct discharge of fuel vapor into the external air; In the desorption process, because the inner wall of the second cavity 210 is a smooth structure and there is no dead corner, the possibility of carbon powder accumulation at the dead corner is minimized, so that all carbon powder can adsorb fuel vapor and improve the adsorption effect. Thus, when the atmosphere enters the second chamber 210, it is conducive to make the fuel vapor adsorbed by the carbon powder separate from the carbon powder and enter the engine intake system, so as to realize the full combustion utilization of the oil and gas and avoid the increase of engine fuel consumption caused by the direct discharge of the oil and gas.

In addition, the second cavity 210 is connected with the first cavity 110 so that the fuel vapor can enter the second cavity 210 through the first cavity 110, so that the fuel vapor can be adsorbed through the carbon powder in the first cavity 110 and the carbon powder in the second cavity 210 respectively, so as to improve the adsorption effect of the fuel vapor and effectively avoid the exhaust of the fuel vapor; At the same time, the external atmosphere can also enter the first cavity 110 through the second cavity 210, so that the carbon powder in the second cavity 210 and the carbon powder in the first cavity 110 can be cleaned respectively through the atmosphere, so as to make full use of the fuel vapor.

Because the second cavity 210 is in a circular platform shape, the flow length can be increased in the air flow path under the condition of the same carbon powder, so that the carbon powder can adsorb fuel vapor molecules more effectively and thoroughly.

Based on the above settings, the carbon canister assembly in the embodiment of the application has no dead corner, so that the carbon powder is evenly arranged in the first cavity 110 and the second cavity 210, so that the fuel vapor molecules adsorbed by the carbon powder are easily swept away by air in the desorption process, so as to ensure the recycling of the carbon canister assembly and the adsorption effect.

It should be noted that the filled adsorption materials in the first cavity 110 and the second cavity 210 can be any existing adsorption materials commonly used in the art that can adsorb fuel vapor. The embodiment of the application does not limit the source, specific type or composition of the above adsorption materials, and they can all use commercially purchased or commercially available products, such as carbon powder, the embodiment of the present application does not involve the improvement of the material composition.

The second cavity 210 has a small end 211 and a large end 212, the small end 211 is located at the top of the second cavity 210, and the large end 212 is located at the bottom of the second cavity 210. The second cavity 210 adopts a circular cross-section structure from the bottom end diameter to the end of the atmospheric port 220, that is, the top, which increases the flow length of the same carbon powder on the air flow path, making the adsorption of oil and gas molecules more effective and thorough.

In order to realize communication with the outside, the auxiliary carbon tank 200 is provided with an atmospheric port 220 for communication with the outside atmosphere, which is located at the small end 211 of the second cavity 210 and communicated with the second cavity 210.

Based on this, the gas adsorbed by the carbon powder can be discharged into the external atmosphere through the atmospheric port 220. At the same time, the external atmosphere can also enter the second cavity 210 and the first cavity 110 to clean the carbon powder in the second cavity 210 and the first cavity 110, so that the cleaned oil and gas can enter the intake system of the engine for combustion and utilization.

Since the atmospheric port 220 is arranged at the small end 211 of the second cavity 210, the cross-sectional area of the second cavity 210 gradually decreases from the end away from the atmospheric port 220 to the end provided with the atmospheric port 220, thereby increasing the flow length of the same toner on the air flow path, making the adsorption of oil and gas molecules more effective.

In addition, the second chamber 210 is arranged in a circular platform shape, and the atmospheric port 220 is arranged at the small end 211 of the second chamber 210, so that the air flow to the atmospheric port 220 is more stable and smooth, the overall air flow resistance of the carbon canister assembly is reduced, the fuel vapor enters the carbon canister assembly and escapes regularly, effectively reducing the system resistance and increasing the performance of the carbon canister assembly.

Alternatively, the communication between the main carbon canister 100 and the auxiliary carbon canister 200 is close to the large end 212 of the second cavity 210. In this way, the fuel vapor can flow from the large end 212 area to the small end 211 area of the second cavity 210, which is conducive to the smooth flow of fuel vapor.

In order to realize the adsorption process and desorption process, the main carbon tank 100 is provided with an adsorption port 120 and a desorption port 130. The adsorption port 120 is used to communicate with the oil tank, the desorption port 130 is used to communicate with the air inlet system of the engine, and both the adsorption port 120 and the desorption port 130 are connected with the first cavity 110. Based on this, in the adsorption process, the fuel vapor in the oil tank can enter the first cavity 110 through the adsorption port 120 and flow to the second cavity 210 through the first cavity 110 to adsorb the fuel vapor through the carbon powder in the first cavity 110 and the second cavity 210, so as to discharge the adsorbed gas into the external environment, so as to prevent the fuel vapor from polluting the external environment.

In the desorption process, the external atmosphere enters the second cavity 210 through the atmospheric port 220 and enters the first cavity 110 through the second cavity 210, so that the fuel vapor in the second cavity 210 and the first cavity 110 is separated from the carbon powder, and enters the air inlet system of the engine with the gas through the desorption port 130, so as to realize the reuse of fuel vapor and improve the fuel saving performance of the engine.

Alternatively, a buffer area 300 is provided at the communication between the main carbon tank 100 and the auxiliary carbon tank 200. Specifically, a channel is connected between the main carbon tank 100 and the auxiliary carbon tank 200, and an empty buffer area 300 is formed in the inner cavity of the channel. By setting the vacant buffer area 300, on the one hand, the communication between the first cavity 110 and the second cavity 210 can be realized to facilitate the mutual flow of gas, on the other hand, the gas can be buffered to make the gas flow more stable and smooth.

Alternatively, the main canister 100, the vacant buffer area 300 and the auxiliary canister 200 form a U-shaped cavity structure so that the fuel vapor forms a U-shaped flow path in the canister assembly. Based on this, the flow path of fuel vapor can be extended, so as to improve the adsorption effect of fuel vapor. In addition, the air flow can be more stable and smooth.

In order to ensure that the toner is not easy to wear, a diaphragm spring is arranged at the bottom of the main carbon tank 100 and the auxiliary carbon tank 200. Based on this, the diaphragm spring can support the main carbon canister 100 and the auxiliary carbon canister 200, and can also buffer the main carbon canister 100 and the auxiliary carbon canister 200, so as to alleviate the problem of wear between carbon powder particles caused by the shaking of the whole vehicle.

In some embodiments, the main carbon canister 100 and the auxiliary carbon canister 200 are injection molded from nylon plastic. Based on this, the manufacturing cost can be reduced and easy to manufacture.

The application also discloses an engine, including the carbon canister assembly.

The invention claimed is:

1. A carbon canister assembly, comprising:

a main carbon canister including a cylindrical first cavity;

an adsorption material for adsorbing evaporated fuel vapor, the adsorption material disposed in the first cavity; and an auxiliary carbon canister including a second cavity in communication with the first cavity, the second cavity having a truncated cone shape in which a diameter of a cross section of the second cavity gradually decreases from a bottom of the second cavity to a top of the second cavity.

2. The carbon canister assembly according to claim 1, wherein:

the auxiliary carbon canister includes an atmospheric port for communicating with the external atmosphere;

the atmospheric port is located at a small end of the second cavity; and the atmospheric port is in communication with the second cavity.

3. The carbon canister assembly according to claim 2, wherein the main carbon canister and the auxiliary carbon canister are in communication proximate a large end of the second cavity.

4. The carbon canister assembly according to claim 1, wherein:

the main carbon canister includes an adsorption port for communicating with an oil tank;

the main carbon canister includes a desorption port for communicating with an air inlet system; and the adsorption port and the desorption port are in communication with the first cavity.

5. The carbon canister assembly according to claim 1, wherein an empty buffer area is formed between the main carbon canister and the auxiliary carbon canister.

6. The carbon canister assembly according to claim 5, wherein the main carbon canister, the empty buffer area, and the auxiliary carbon canister form a U-shaped cavity structure so that the fuel vapor forms a U-shaped flow path in the carbon canister assembly.

7. The carbon canister assembly according to claim 1, wherein the main carbon canister and the auxiliary carbon canister are each an injection molded body composed of nylon plastic.

8. An engine, comprising the carbon canister assembly according to claim 1.

9. The carbon canister assembly according to claim 1, wherein a wall of the main carbon canister has a smooth inner surface that at least partially defines the first cavity.

10. The carbon canister assembly according to claim 1, wherein a wall of the auxiliary carbon canister has a smooth inner surface that at least partially defines the second cavity.

11. The carbon canister assembly according to claim 1, wherein:

the adsorption material is further disposed in the second cavity; and the adsorption material is evenly arranged in the first cavity and the second cavity.

12. A carbon canister assembly, comprising:

a main carbon canister including a first cavity;

an adsorption material for adsorbing evaporated fuel vapor disposed in the first cavity; and an auxiliary carbon canister including a second cavity in communication with the first cavity;

wherein a diameter of a cross section of the second cavity gradually decreases from a first end of the second cavity to a second end of the second cavity; and wherein the main carbon canister and the auxiliary carbon canister are each an injection molded body composed of nylon plastic.

13. The carbon canister assembly according to claim 12, wherein the first cavity is cylindrical.

14. The carbon canister assembly according to claim 12, wherein the second cavity is a circular truncated cone shape.

15. The carbon canister assembly according to claim 12, wherein:

the auxiliary carbon canister includes an atmospheric port for communicating with the external atmosphere;

the atmospheric port is disposed at the second end of the second cavity; and the atmospheric port is in communication with the second cavity.

16. The carbon canister assembly according to claim 15, wherein the main carbon canister and the auxiliary carbon canister are in communication proximate the first end of the second cavity.

17. The carbon canister assembly according to claim 12, wherein:

the main carbon canister includes an adsorption port for communicating with an oil tank;

the main carbon canister includes a desorption port for communicating with an air inlet system; and the adsorption port and the desorption port are in communication with the first cavity.

18. The carbon canister assembly according to claim 12, wherein an empty buffer area is formed between the main carbon canister and the auxiliary carbon canister.

19. The carbon canister assembly according to claim 18, wherein the main carbon canister, the empty buffer area, and the auxiliary carbon canister form a U-shaped cavity structure so that the fuel vapor forms a U-shaped flow path in the carbon canister assembly.

\* \* \* \* \*